June 10, 1941.
J. C. BONNEY
2,245,321
PROTRACTOR
Filed Jan. 4, 1940
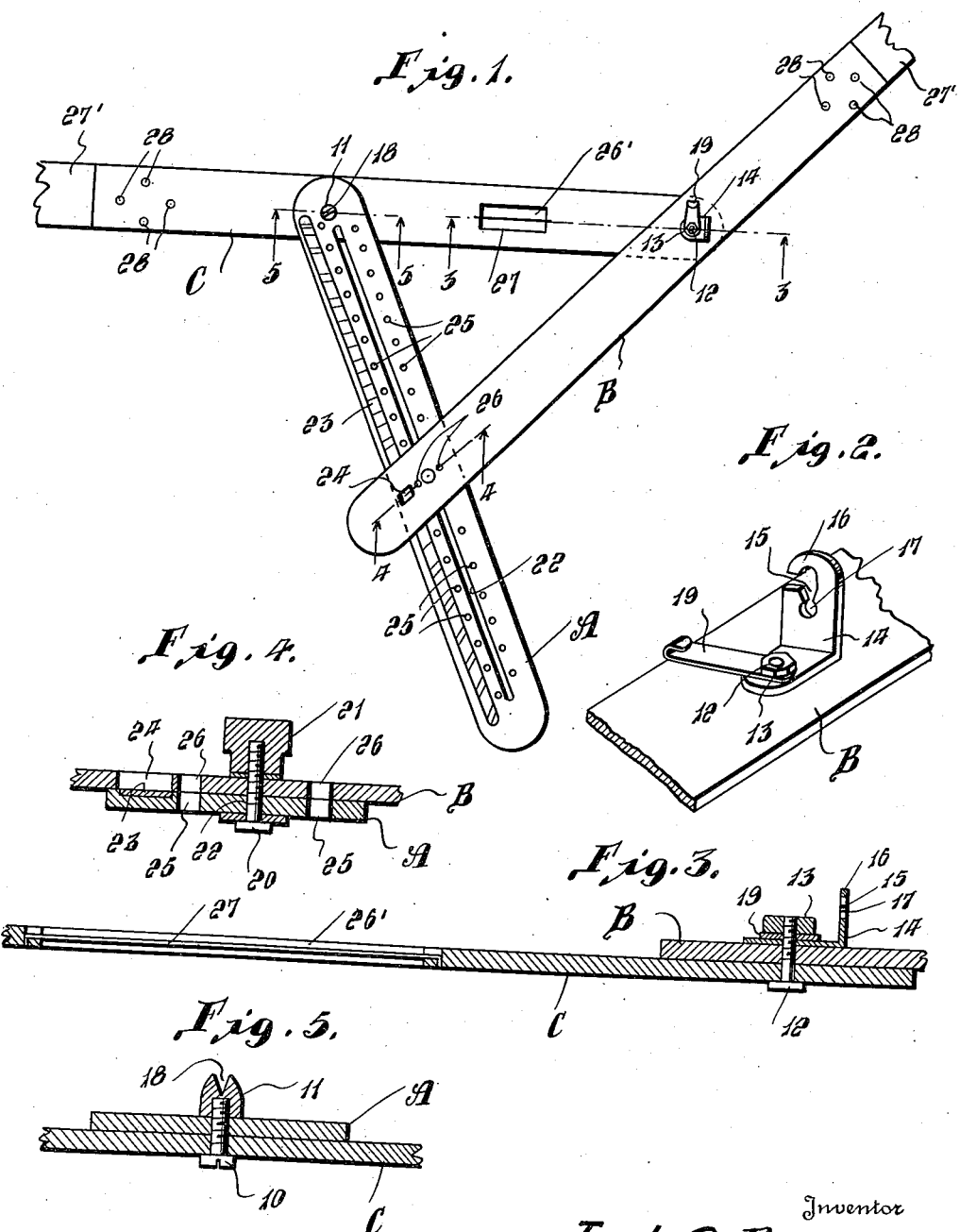
Inventor
Jack C. Bonney
By L. F. Randolph
Attorney Patented June 10, 1941

2,245,321

UNITED STATES PATENT OFFICE 2,245,321

PROTRACTOR

Jack C. Bonney, Baytown, Tex.

Application January 4, 1940, Serial No. 312,419

2 Claims. (Cl. 33—86)

This invention relates to a protractor particularly adapted for measuring or laying out angles on any desired scale and consists of a device having three blades and three pivot points, one of which operates in an elongated slot, so that the distance between two points may be maintained constant and the distance of the other varied with respect thereto so that the distances may be computed trigonometrically.

The more specific objects and advantages will become apparent from a consideration of the description following taken in connection with accompanying drawing illustrating an operative embodiment.

In said drawing:

Figure 1 is a plan view of the device;

Figure 2 is a fragmentary perspective view of a portion of one of the blades;

Figure 3 is a longitudinal sectional view taken on the line 3—3 of Figure 1;

Figure 4 is a sectional view taken on the line 4—4 of Figure 1, and

Figure 5 is a sectional view taken on the line 5—5 of Figure 1.

Referring specifically to the drawing wherein like reference characters designate like or similar parts, three blades are employed at A, B and C, of any desired length, size and material, each blade having parallel sides or straight edges as shown. A bolt 10 extends through and pivotally connects the blades A and C. A clamping nut 11 is provided on the bolt 10.

Another bolt 12 pivotally connects the blades B and C, the same having a nut 13 thereon. Also adjustably secured in place by the nut 13 is an angle bracket 14 having a slot 15, providing a hook 16, and the slot having a constricted throat as at 17. A line or the like may be engaged in the slot 15 and also in a V-notch 18 provided in the nut 11.

Said nut 13 further secures a hook 19 in place.

A bolt 20 pivotally connects the blades A and B, the same including a nut 21. Said blade A has a substantially central longitudinally extending slot 22 through which the bolt 20 passes.

Calibrations, indications, marks or any equivalent are provided in a line as at 23 along one side edge of the blade A to indicate different angles and an opening 24 is provided through the blade B to aline with such indications 23 and enable the same to be viewed through the opening. In addition, rows of holes 25 are provided longitudinally of the blade A on each side of the slot 22, each in line with an angle mark of the calibrations 23 and adapted for registration by openings 26 provided through the blade B, in substantial alinement with the bolt 20 and opening 24.

The device may be used in measuring angles on irregular plots of land or the equivalent. In such instances, a line is tied to the nut 21 and extended past the pivot member 12 and anchored beyond the arm B to serve as an extension thereof and the hook 16 may be engaged with such line whereby it will be in alinement with the arm B. Another line may be fastened to the hook 19 and extended past the bolt 11 and anchored beyond the arm C, the hook 19 being pulled by reason of its pivotal movement into alinement with the second mentioned line and the groove 18 being engaged with the second mentioned line. The angle from the distal extremities of the lines may be read in slot 24.

It will be noted that the distance between the bolts 10 and 12 is maintained constant while the distance between the bolts 10 and 20 may be varied. The latter distance may be computed trigonometrically for every value of the angles of the calibrations 23. The openings 25 are angle sight openings or holes. The openings or holes 26 are also angle sight holes and they are used for visually alining the arm B with respect to the angle calibrations 23 and they may also be used to accommodate a bolt like 20 to secure the arms A and B in solid relation.

As previously stated, a chalk line or other marker line or the equivalent may be alined and held in the slots 18 and 15 and such line may also be clamped by the nut 21. Chalk lines may be used, fastened in the manner stated, for extending the arms A, B and C for exceptionally long distances.

Blade C may have a slot 26' therethrough in which a line 27 is located in the nature of a wire, bar or the like on the center line 10—12 for the purpose of hanging a line level thereon which is used for leveling the bar C.

Extension arms such as at 27' may be used on any of the arms and particularly the arms B and C, for instance being detachably bolted or screwed thereto as at 28.

The device may be used generally and particularly by draftsmen, mechanics or by anyone where it is necessary to measure or layout angles. In the drafting room, the device may be constructed as a variable triangle or have a sliding T-head on one end.

The ease of operation is not the only advantage to a mechanic since he may also easily lengthen the arms. The invention may be incorporated in industrial machines. For the use of carpenters, numerals may be added to one or more of the blades for scaling the pitch of a roof or the like. It is clear that for draftsmen, the device may be made in the form of a triangle, that is have the unnecessary length of the arms beyond the pivots 10, 12 and 20 dispensed with.

Various changes may be resorted to provided they fall within the spirit and scope of the invention.

I claim as my invention:

1. A protractor of the class described having a blade, second blades, said second blades each being connected by pivot members at a different point to the first mentioned blade, one of the second blades having an elongated longitudinally extending slot, the other second mentioned blade having a pivot means extending through and movable in said slot, angle indicating means coacting with both of the second mentioned blades, a bracket mounted by one of the pivot members having an opening for engagement with a line fastened to said pivot means, an element on the same pivot member as the bracket serving as an anchor means for a second line, and the other pivot member having a notch to engage the second line.

2. A protractor of the class described having a blade, second blades, first, second and third pivot members connecting the blades in triangular relation, means whereby the second pivot member slidably connects the second blades, a bracket adjustably mounted by the first pivot member having an opening for engagement with a line fastened to the second pivot member, an element pivoted on the first pivot member serving as anchor means for a second line, and the third pivot member having a notch to engage the second line.

JACK C. BONNEY.